United States Patent
Shafer et al.

(10) Patent No.: US 7,869,121 B2
(45) Date of Patent: Jan. 11, 2011

(54) SMALL ULTRA-HIGH NA CATADIOPTRIC OBJECTIVE USING ASPHERIC SURFACES

(75) Inventors: David R. Shafer, Fairfield, CT (US); J. Joseph Armstrong, Milpitas, CA (US); Yung-Ho Chuang, Cupertino, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 0 days.

(21) Appl. No.: 11/375,316

(22) Filed: Mar. 13, 2006

(65) Prior Publication Data

US 2006/0238856 A1    Oct. 26, 2006

Related U.S. Application Data

(63) Continuation-in-part of application No. 11/093,850, filed on Mar. 29, 2005, which is a continuation-in-part of application No. 10/434,374, filed on May 7, 2003.

(60) Provisional application No. 60/667,237, filed on Mar. 31, 2005, provisional application No. 60/449,326, filed on Feb. 21, 2003.

(51) Int. Cl.
*G02B 5/08* (2006.01)

(52) U.S. Cl. ............... 359/351; 359/364; 359/708; 359/727

(58) Field of Classification Search ............ None
See application file for complete search history.

(56) References Cited

U.S. PATENT DOCUMENTS

| 1,973,066 | A | 9/1934 | Hauser et al. |
| 2,661,658 | A | 12/1953 | Dyson |
| 3,237,515 | A | 3/1966 | Altman |
| 4,155,630 | A | 5/1979 | Ih |
| 4,511,220 | A | 4/1985 | Scully |

(Continued)

FOREIGN PATENT DOCUMENTS

WO    WO 2004019128    3/2004

OTHER PUBLICATIONS

"Catadioptric". The American Heritage Dictionary of the English Language (2003). Retrieved Oct. 13, 2006, from xreferplus. http://www.xreferplus.com/entry/4071341.*

*Primary Examiner*—Stephone B Allen
*Assistant Examiner*—Derek S Chapel
(74) *Attorney, Agent, or Firm*—Smyrski Law Group, A P.C.

(57) ABSTRACT

A relatively high NA objective employed for use in imaging a specimen is provided. The objective includes a lens group having at least one focusing lens configured to receive light energy and form an intermediate image, at least one field lens oriented to receive the intermediate image and provide intermediate light energy, and a Mangin mirror arrangement positioned to receive the intermediate light energy and apply light energy to the specimen. One or more elements may employ an aspheric surface. The objective may provide an uncorrected spectral bandwidth up to approximately 193 to 266 nanometers and numerical apertures in excess of 0.9. Elements are less than 100 millimeters in diameter and may fit within a standard microscope. The field lens may include more than one lens and may be formed of a material different from at least one other lens in the objective.

19 Claims, 5 Drawing Sheets

U.S. PATENT DOCUMENTS

| | | |
|---|---|---|
| 4,647,158 A | 3/1987 | Yeadon |
| 4,758,088 A | 7/1988 | Doyle |
| 4,779,966 A | 10/1988 | Friedman |
| 4,795,244 A | 1/1989 | Uehara |
| 4,898,471 A | 2/1990 | Stonestrom et al. |
| 4,971,428 A | 11/1990 | Moskovich |
| 4,974,094 A | 11/1990 | Morito |
| 5,031,976 A | 7/1991 | Shafer |
| 5,073,016 A | 12/1991 | Burke |
| 5,089,913 A | 2/1992 | Singh et al. |
| 5,114,238 A | 5/1992 | Sigler |
| 5,140,459 A | 8/1992 | Sagan |
| 5,162,939 A | 11/1992 | Herron et al. |
| 5,177,559 A | 1/1993 | Batchelder et al. |
| 5,233,460 A | 8/1993 | Partlo |
| 5,264,912 A | 11/1993 | Vaught et al. |
| 5,274,494 A | 12/1993 | Rafanelli et al. |
| 5,309,456 A | 5/1994 | Horton |
| 5,323,263 A | 6/1994 | Schoenmakers |
| 5,337,170 A | 8/1994 | Khoury et al. |
| 5,428,442 A | 6/1995 | Lin et al. |
| 5,434,662 A | 7/1995 | Rockwell et al. |
| 5,488,229 A | 1/1996 | Elliott et al. |
| 5,515,207 A | 5/1996 | Foo |
| 5,621,529 A | 4/1997 | Gordon et al. |
| 5,636,066 A | 6/1997 | Takahashi |
| 5,644,140 A | 7/1997 | Biedermann et al. |
| 5,668,673 A | 9/1997 | Suenaga et al. |
| 5,717,518 A | 2/1998 | Shafer et al. |
| 5,729,374 A | 3/1998 | Tiszauer et al. |
| 5,805,334 A | 9/1998 | Takahashi |
| 5,805,357 A | 9/1998 | Omura |
| 5,808,797 A | 9/1998 | Bloom et al. |
| 5,808,805 A | 9/1998 | Takahashi |
| 5,835,275 A | 11/1998 | Takahashi et al. |
| 5,849,468 A | 12/1998 | Sawyer |
| 5,851,740 A | 12/1998 | Sawyer |
| 5,861,997 A | 1/1999 | Takahashi |
| 5,880,891 A | 3/1999 | Furter |
| 5,940,222 A * | 8/1999 | Sinclair et al. ............... 359/689 |
| 5,990,983 A | 11/1999 | Hargis et al. |
| 5,999,310 A | 12/1999 | Shafer et al. |
| 6,064,517 A | 5/2000 | Chuang et al. |
| 6,097,537 A * | 8/2000 | Takahashi et al. ........... 359/364 |
| 6,157,498 A * | 12/2000 | Takahashi .................... 359/728 |
| 6,191,887 B1 | 2/2001 | Michaloski et al. |
| 6,275,514 B1 | 8/2001 | Katzir et al. |
| 6,324,015 B1 * | 11/2001 | Fuse ........................... 359/662 |
| 6,370,178 B1 | 4/2002 | Papayoanou et al. |
| 6,392,793 B1 * | 5/2002 | Chuang et al. ............... 359/364 |
| 6,548,797 B1 | 4/2003 | Ai |
| 6,621,557 B2 * | 9/2003 | Takahashi ..................... 355/67 |
| 6,631,036 B2 * | 10/2003 | Schuster ...................... 359/726 |
| 6,636,350 B2 * | 10/2003 | Shafer et al. ................. 359/366 |
| 6,639,734 B2 * | 10/2003 | Omura ........................ 359/730 |
| 6,665,126 B2 * | 12/2003 | Shafer et al. ................. 359/649 |
| 6,707,532 B2 * | 3/2004 | Suzuki ......................... 355/52 |
| 6,757,051 B2 * | 6/2004 | Takahashi et al. ............. 355/67 |
| 6,842,298 B1 * | 1/2005 | Shafer et al. ................. 359/730 |
| 6,898,024 B2 | 5/2005 | Takeuchi et al. |
| 2003/0011894 A1 * | 1/2003 | Schuster ...................... 359/731 |
| 2003/0234992 A1 * | 12/2003 | Shafer ......................... 359/850 |
| 2004/0075894 A1 * | 4/2004 | Shafer et al. ................. 359/365 |
| 2004/0165257 A1 | 8/2004 | Shafer et al. |
| 2005/0190435 A1 * | 9/2005 | Shafer et al. ................. 359/365 |

* cited by examiner

SMALL ULTRA-HIGH NA CATADIOPTRIC OBJECTIVE USING ASPHERIC SURFACES

This application claims the benefit of U.S. Provisional Patent Application 60/667,237, "Small Ultra-high NA Catadioptric Objective Using Aspheric Surfaces," filed Mar. 31, 2005, which is a continuation in part of U.S. patent application Ser. No. 11/093,850, entitled "Small Ultra-high NA Catadioptric Objective," filed Mar. 29, 2005, which is a continuation-in-part of U.S. patent application Ser. No. 10/434,374, entitled "High Performance Catadioptric Imaging System," inventors David G. Shafer, et al., filed May 7, 2003, which claims the benefit of U.S. Provisional Patent Application Ser. No. 60/449,326, entitled "High Performance, Low Cost Catadioptric Imaging System," filed Feb. 21, 2003.

BACKGROUND OF THE INVENTION

1. Field of the Invention

The present invention relates generally to the field of optical imaging and more particularly to catadioptric optical systems used for microscopic imaging, inspection, and lithography applications.

2. Description of the Related Art

Many optical systems have the ability to inspect or image features on the surface of a specimen, such as inspecting defects on a semiconductor wafer or photomask, or alternately examining a biological specimen on a slide. Microscopes have been used in various imaging situations, including biology, metrology, semiconductor inspection, and other complex inspection applications where high resolution images of small areas and/or features are desired.

Many such imaging systems are currently available, including those disclosed by applicants in various other issued patents and patent applications, including but not limited to U.S. patent application Ser. No. 10/434,374 and U.S. Pat. No. 6,064,517. The objective disclosed in the '374 application is a small catadioptric objective exhibiting beneficial optical qualities. The small size catadioptric optical design of the '374 application exhibits generally good overall performance, especially at relatively high numerical apertures (NAs) over a very broad spectral range in the deep ultra-violet (DUV) light region. However, chromatic correction becomes increasingly difficult for performance in the DUV region. The objectives disclosed in the '517 patent are large catadioptric objectives that also exhibit desired optical qualities. The large catadioptric optical designs in the '517 patent are corrected over a narrow spectral bandwidth and are capable of ultra-high NAs imaging over very large field sizes.

These objectives generally provide advantages in their size, arrangement of lens groups, and the fact that they can be made from a single glass material. Such designs include lenses that can generally be categorized into three groups; a focusing lens group, a field lens group, and a catadioptric group. Lenses in these groups have very different arrangements and are used in different ways to achieve different goals.

Objectives in the aforementioned applications can benefit from enhanced NAs and field sizes. Generally, the NA represents the range of angles for which light can be delivered to and collected from a specimen using the design. The field size is the diameter at the specimen location over which all the optical performance requirements are satisfied. For example, certain systems may successfully and efficiently employ "ultra-high NA" imaging over large field sizes. Here, ultra-high NA illumination and imaging angles may include but are not limited to angles up to and above 76 degrees. Certain previous designs can only provide NAs lower than this ultra-high range, and exhibit smaller field size, larger optical element diameters, or very tight tolerances in the high end applications discussed. In general, larger NAs, larger field sizes, small element diameters, and loose tolerances for a given objective can be beneficial, particularly when constructed from a single material and/or operating in association with light energy at specific advantageous wavelengths. With respect to optical element diameters, smaller diameters result in more compact and less expensive to manufacture objectives. Further, smaller optical element diameters can be employed in certain specific applications, such as microscopy.

Based on the optical characteristics desirable in such a design, an ultra-high NA and large field can offer improved capabilities when inspecting specimens using light energy in the DUV range. For example, but not by way of limitation, operation at wavelengths of 193, 213, 244, 257, 266, 325, 355 or greater up through visible wavelengths may result in beneficial performance in certain circumstances. In addition, small size and loose manufacturing tolerances make the design practical to manufacture. Previous ultra-high NA designs do not demonstrate this capability It would therefore be beneficial to provide a system and objective for use in conjunction with standard microscopes and microscopy applications that overcome the foregoing drawbacks present in previously known imaging systems. Further, it would be beneficial to provide an optical inspection system design having improved functionality over devices exhibiting the negative aspects described herein.

SUMMARY OF THE INVENTION

According to one aspect of the present design, there is provided an objective and method employed for use in imaging a specimen. The objective may comprise a lens group having at least one focusing lens and a Mangin mirror arrangement or catadioptric group positioned to receive intermediate light energy or an intermediate image and apply light energy to the specimen, with at least one surface in the catadioptric group having an aspheric surface.

These and other advantages of the present invention will become apparent to those skilled in the art from the following detailed description of the invention and the accompanying drawings.

DESCRIPTION OF THE DRAWINGS

The present invention is illustrated by way of example, and not by way of limitation, in the figures of the accompanying drawings in which.

DETAILED DESCRIPTION OF THE INVENTION

Figure 1:
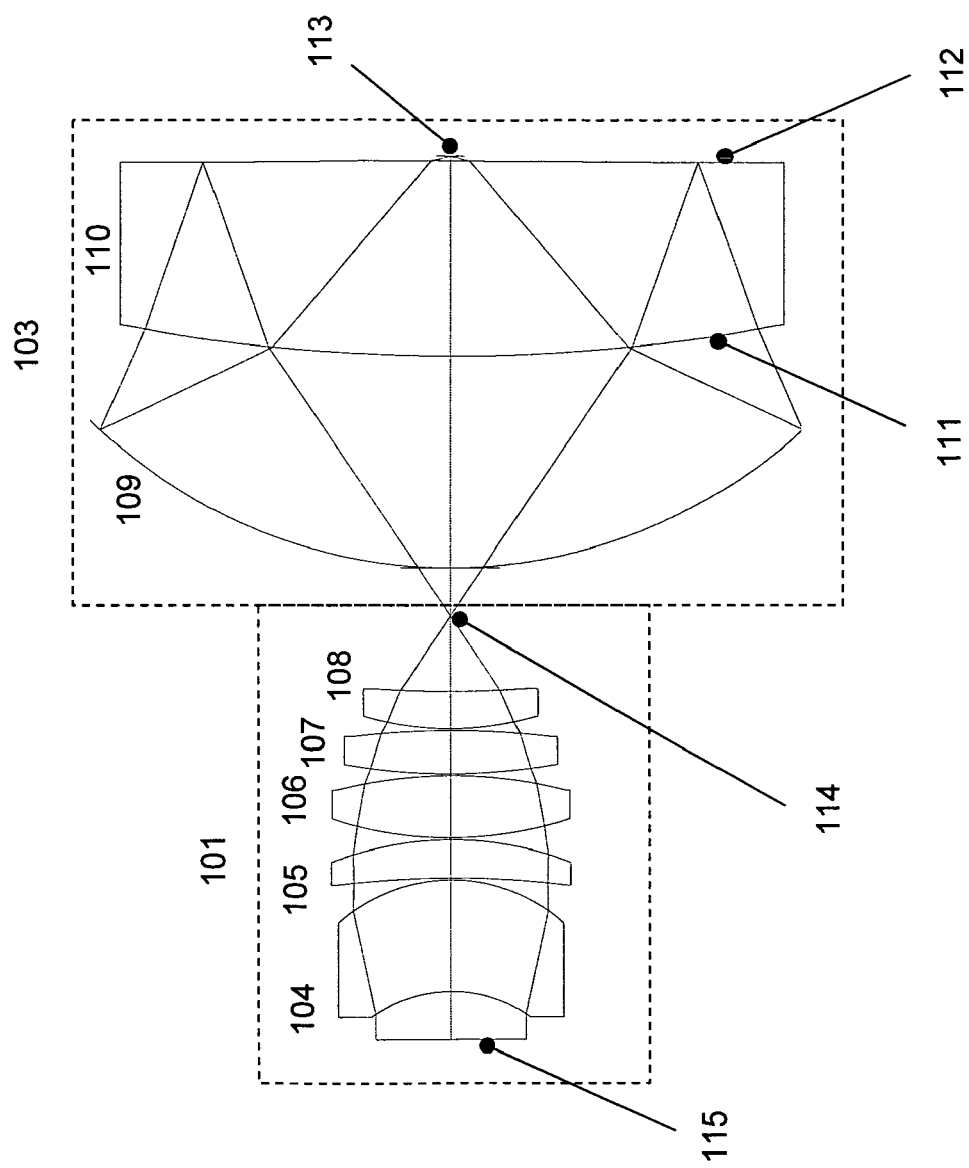
FIG. 1 illustrates an aspheric objective comprising a focusing lens group and a catadioptric group, where the focusing lens group includes multiple lenses.

According to the present design, there is provided a small catadioptric objective having ultra-high numerical aperture, large field, small size, and loose tolerances for use in advanced applications such as microscopy and semiconductor inspection. This small ultra-high NA objective is ideally suited for a variety of dark field and bright field imaging schemes. The present design is capable of delivering and collecting light at angles up to 76 degrees from the sample normal. The present design may be used and optimized for light beams having different wavelengths, from the infrared to the deep ultraviolet. For example, in the ultraviolet spectrum, light beams having wavelengths of 193 nm, 213 nm, 244 nm, 248 nm, 257 nm, 266 nm, and so forth are possible using the concepts disclosed herein, with adjustments that would be achievable by those skilled in the art. For wavelengths from 110-200 nm, fluoride glasses may be employed due to their transmission properties.

The present catadioptric optical system provides high quality imaging performance at numerical apertures (NAs) up to 0.97. This NA range represents the capability to illuminate and image at very high angles of incidence. The relationships between the numerical aperture in air and the angle of incidence to the sample are that:

$$NA = n * \sin(\text{angle of incidence})$$

where the index n has a value of 1.000 for air. The following table summarizes the relation between NA and the angle of incidence in air:

| NA (in air) | Angle of incidence (degrees) |
| --- | --- |
| 0.90 | 64 |
| 0.91 | 66 |
| 0.92 | 67 |
| 0.93 | 68 |
| 0.94 | 70 |
| 0.95 | 72 |
| 0.96 | 74 |
| 0.97 | 76 |

In general, the present design may comprise lenses formed from a single glass material. In UV-DUV applications, fused silica is employed due to its high transmission properties. In addition, fused silica also has adequate thermal stability and is relatively easy to polish.

The present invention uses aspheric surfaces in the catadioptric group to provide benefits over previous catadioptric designs. As is generally known to those skilled in the art, aspheric lenses comprise a compound curve rather than sections of a sphere. In other words, a spherical surface of a lens may be slightly altered to form a compound curve, with the result being reduced spherical aberration. An aspheric lens generally allows wide angle viewing with relatively low distortion. Previous small broad band designs typically have limited NA and field size since the net refractive power in the catadioptric group must be negative to correct for primary axial color in the focusing lens group. The present design uses narrow band light to obviate the requirement for axial color compensation. Use of narrow band light allows the refractive portion of the catadioptric group to have a net power that is either zero or positive. Also, in the previous small broad band designs, the field lens group images light energy from the catadioptric group into the focusing lens group to correct for lateral color. With the present design, a similar kind of imaging occurs using the field lens group, but the field lens group is designed to instead be used to control monochromatic aberrations, such as high-order spherical aberration and coma.

Previous large catadioptric ultra-high NA designs have decenter tolerances that are very tight, or restrictive, making manufacturing difficult. Tight tolerances are generally caused by steep angles of incidence in the focusing lens group. Previous designs required high angles of incidence to generate high-order spherical aberration and coma to compensate for aberrations generated inside the catadioptric group. In the present design, decenter tolerances may be reduced in the focusing lens group by reducing high-order aberrations in the catadioptric group so they do not need to be addressed by the focusing group. Reducing high-order aberrations in the catadioptric group is not a simple matter for an ultra-high NA system. With a simple catadioptric group having just one refractive element, no solution similar to the one described herein is possible. Good results can be attained for either higher-order spherical aberration or for higher-order coma, but not both at once with a simple (single refractive element) catadioptric group.

The present design addresses higher-order spherical aberration or higher order coma by using different design approaches that incorporate aspheric surfaces in the catadioptric group. One design approach uses a three element catadioptric group with a spherical mirror, a lens used in triple-pass, and a Mangin element near the specimen or wafer.

FIG. 1 illustrates one embodiment according to the present design. The design comprises a focusing lens group 101 and a catadioptric group 103. The focusing lens group 101 includes lenses 104-108. Intermediate image 114 is formed by first lens group 101. This design does not provide a lens in proximity to the intermediate image 114. The intermediate image 114 is formed in proximity to the vertex of the spherical mirror 109 in catadioptric group 103. The catadioptric group comprises two elements including a spherical mirror 109 and a Mangin element 110. In this design, both sides of the Mangin element 110 are aspheric.

Table 1 presents the lens prescriptions for the embodiment illustrated in FIG. 1.

TABLE 1

Lens prescription for the design form in FIG. 1

| Surf | Radius | Thickness | Glass | Diameter |
| --- | --- | --- | --- | --- |
| OBJ | Infinity | Infinity | | 0.000 |
| STO | Infinity | 4.997 | | 15.520 |
| 2 | −14.000 | 11.579 | Fused silica | 16.399 |
| 3 | −17.304 | 0.200 | | 23.240 |
| 4 | −98.007 | 4.000 | Fused silica | 24.146 |
| 5 | −33.349 | 0.200 | | 24.707 |
| 6 | 38.703 | 6.500 | Fused silica | 24.531 |
| 7 | −47.501 | 0.200 | | 23.797 |
| 8 | 61.192 | 4.500 | Fused silica | 21.950 |
| 9 | −87.147 | 0.200 | | 20.278 |
| 10 | 31.292 | 3.881 | Fused silica | 17.973 |
| 11 | 108.432 | 12.829 | | 15.373 |
| 12 | Infinity | 22.122 | | 10.244 |
| 13 | 175.205 | 20.275 | Fused silica | 68.000 |
| 14 | 1161.000 | −20.275 | MIRROR | 56.000 |
| 15 | 175.205 | −22.122 | | 68.000 |
| 16 | 52.141 | 22.122 | MIRROR | 74.000 |
| 17 | 175.205 | 20.275 | Fused silica | 68.000 |
| 18 | −1161.000 | 0.500 | | 56.000 |
| IMA | Infinity | | | 2.956 |

As may be appreciated by one skilled in the art, the numbers in the leftmost column of Table 1 represent the surface number counting surfaces from the left of FIG. 1. For example, the left surface of lens 104 in the orientation presented in FIG. 1 (surface 2 in Table 1) has a radius of curvature of −14.000 mm, a thickness of 11.579 mm, and the rightmost surface (surface 2) has a radius of curvature of −17.304 mm, and is 0.2 mm from the next surface. The material used is fused silica.

In the design presented in FIG. 1, both sides of Mangin element 110 have aspheric shapes. Many equations can be used to represent an aspheric shape. Equation (1) represents the aspheric surfaces for the lens prescription in Table 1.

$$z = \frac{cr^2}{1 + \sqrt{1-(1+k)c^2 r^2}} + \sum_{i=1}^{N} \alpha_i \rho^{2i}, \quad (1)$$

where z is the sag or the distance from the surface to the plane tangent to the element vertex. The first expression represents the sag of a standard spherical surface where c is the surface curvature or the inverse of the radius of curvature. The parameter r can range from 0 to one half of the element diameter. The parameter k is the conic constant. For spherical surfaces, k is equal to 0. The aspheric terms are included in the summation of Equation (1). Here N is the number of aspheric terms, ρ is the normalized element radius (half of the element diameter), and α represents the aspheric coefficients.

Note that while a radius and thickness is provided for, for example, surfaces 13 and 14, those surfaces are in fact aspheric and conform to Equation (1) above. As used herein, while certain surfaces have radius and thickness associated therewith, those aspheric surfaces are specifically identified or called out and conform to Equation (1) according to the factors outlined herein.

For the design shown in FIG. 1, Table 2 lists the surface sag parameters for the surfaces of the mangin mirror 103. Side 111 of element 110 is listed in Table 1 as surface(s) 13, 15, and 17. The side of an element has one surface entry in the table for each time light interacts with the element, and light contacts side 111 of element 110 three times. Side 112 is represented in Table 1 as surface 14 and 18.

TABLE 2

Aspheric surface parameters for the lens prescription in Table 1.

|  | Surf 13, 15, 17 (side 111) | Surf 14, 18 (side 112) |
| --- | --- | --- |
| Conic constant (k) | 0 | 0 |
| Maximum half diameter (r) mm | 31.3 | 25.3 |
| Curvature (c) 1/mm | 0.005707596 | −0.000861326 |
| $\alpha_1$ | 0 | 0 |
| $\alpha_2$ | −0.5007456 | 0.066216604 |
| $\alpha_3$ | 0.15436574 | 0.18849802 |
| $\alpha_4$ | 2.4440726 | −0.77622711 |
| $\alpha_5$ | −8.0591352 | 2.1065286 |
| $\alpha_6$ | 15.452712 | −3.40366 |
| $\alpha_7$ | −17.60934 | 3.2297916 |
| $\alpha_8$ | 10.948849 | −1.6592768 |
| $\alpha_9$ | −2.8704482 | 0.357102 |

In the design presented in Table 1 and Table 2, the numerical aperture may approach or even exceed approximately 0.97 in air. From FIG. 1, the focusing lens group 101 has the ability to receive light energy and transmit focused light energy. The catadioptric group or Mangin mirror arrangement 103 receives the intermediate energy and provides controlled light energy to the specimen 113. Alternately, the reflected path originates at the specimen, and light reflected from the specimen is received by the catadioptric group or Mangin mirror arrangement 103 and forms and transmits reflected light energy. The focusing lens group receives resultant light energy and transmits focused resultant light energy. An aperture or mask can be placed at the aperture stop 115 to limit or modify the NA of the objective.

The design presented in FIG. 1, Table 1, and Table 2 thus uses a single glass material, fused silica. Other materials may be employed, but it is noted that fused silica or any material used within the design may require low absorption over the range of wavelengths supported by the objective design. Fused silica offers relatively high transmission properties for light energy from 190 nm through the infrared wavelengths. Because of the single material design of the ultra-high NA objective, fused silica can enable the design to be re-optimized for any center wavelength in this wavelength range. For example, the design can be optimized for use with lasers at 193, 198.5, 213, 244, 248, 257, 266, 308, 325, 351, 355, or 364 nm. In addition, if calcium fluoride is employed as a glass or lens material, the design can be employed with an excimer laser at 157 nm. Re-optimization requires slight tuning or altering of components, and may generally be within the abilities of those skilled in the art.

The design of FIG. 1 operates at a 266 nm wavelength and has a field size of approximately 3.0 mm using a maximum element diameter of 74 mm. This field size is significantly larger and performance significantly better than many objective designs previously employed in this wavelength range. This ultra-high NA objective supports a numerical aperture of approximately 0.97 in air and a polychromatic wavefront error of less than approximately 0.054 waves, levels which had been previously unachievable in combination in a single design. Field size in this arrangement represents the size of the area on the specimen that can be imaged the system with minimum degradation in optical performance.

The catadioptric arrangement 103 using aspheric surfaces 109 and 111 allows the objective to simultaneously achieve the above performance goals with very loose tolerances. The highest sensitivity to a 10 micron element decenter in the focusing group 101 is 0.16 waves at 266 nm without compensation. The highest sensitivity to a 10 micron element decenter for the catadioptric group 103 is 0.3 waves at 266 nm without compensation.

The large field size, loose tolerances, low wavefront error, and low number of elements are possible due at least in part to the use of aspheric surfaces in the catadioptric group. Aspheric surfaces reduce the high order field aberrations that were previously produced by spherical surfaces. In particular, high order coma is greatly reduced.

As is true with any optical design, certain tradeoffs may be made to improve performance characteristics depending on the desired application of the objective or optical design. It is possible, for example, to sacrifice field size, numerical aperture, and/or objective size to enhance one of the aforementioned performance characteristics, depending on the application. For example, optimizing for lower or higher NAs is possible. Reducing the NA can reduce the manufacturing tolerance and the outer diameter of the objective. Lower NA designs can provide larger field sizes and larger bandwidths. Lower NA designs with the same performance and fewer optical elements are also possible. Optimizing for higher NAs is also possible, by generally limiting the field size or bandwidth, and requiring slightly increased diameter objective elements.

The design of FIG. 1 is self corrected, where self corrected in this context means that the objective does not require any additional optical components to correct aberrations in order to achieve inspection design specifications. In other words, no additional components are needed to provide a generally aberration free image, or the objective provides substantially complete images without need for additional compensation. The ability to self correct can provide for simpler optical testing metrology and optical alignment to other self corrected imaging optics. Further correction of residual aberrations using additional imaging optics is also possible, where further correction can increase the optical specifications, including but not limited to bandwidth or field size.

Element 110 of FIG. 1 can be challenging to manufacture because both sides of the element have aspheric surfaces that must be precisely aligned. One method to ease this manufacturing is to make the aspheric surfaces individually on separate plates, where each plate has a thickness and the total thickness of both plates is equal to the thickness of element 110. These plates can then be aligned and optically contacted. Alternately, the two plates so formed may be attached using a UV epoxy or index matching fluid. Another option would be to design an air gap between the plates so they do not need to be attached in any manner.

The ultra-high NA objective design presented herein can support various modes of illumination and imaging. Modes supported can include bright field and a variety of dark field illumination and imaging modes. Other modes such as confocal, differential interference contrast, polarization contrast may also be supported using the present design.

Bright field mode is commonly used in microscope systems. The advantage of bright field illumination is the clarity of the image produced. Using bright field illumination with an objective such as that presented herein provides a relatively accurate representation of object feature size multiplied by the magnification of the optical system. The objective and optical components presented herein can be readily used with image comparison and processing algorithms for computerized object detection and classification. Bright field mode typically uses a broad band incoherent light source, but is it also possible to use laser illumination sources and to employ the objective design presented herein.

The confocal mode has been used for optical sectioning to resolve height differences of object features. Most imaging modes have difficulty detecting changes in the height of features. The confocal mode forms separate images of object features at each height of interest. Comparison of the images then shows the relative heights of different features. Confocal mode may be employed using the design presented herein.

Dark field mode has been used to detect features on objects. The advantage of the dark field mode is that flat specular areas scatter very little light toward the detector, resulting in a dark image. Surface features or objects protruding above the object tend to scatter light toward the detector. Thus, when inspecting objects like semiconductor wafers, dark field imaging produces an image of features, particles, or other irregularities on a dark background. The present design may be employed with dark field mode illumination. Dark field mode provides a large resultant signal upon striking small features that scatter light. This large resultant signal allows larger pixels to be employed for a given feature size, permitting faster object inspections. Fourier filtering can also be used to minimize the repeating pattern signal and enhance the defect signal to noise ratio during dark field inspection.

Many different dark field modes exist, each including a specific illumination and collection scheme. Illumination and collection schemes can be chosen such that the scattered and diffracted light collected from the object provides an acceptable signal-to-noise ratio. Certain optical systems use different dark field imaging modes including ring dark field, laser directional dark field, double dark field, and central dark ground. Each of these dark field imaging modes may be employed in the present design.

A second embodiment according to the present design with seven separate elements is possible. The form of the objective is similar to that presented in FIG. 1. The major difference between this lens prescription and the lens prescription in Table 1 and Table 2 is the optimization for a smaller 2 mm field size. This optimization enables a reduction in the diameter of the elements and length of the objective as well as an improvement in the optical performance. Table 3 presents the lens prescriptions for the second embodiment with similar form to that presented in FIG. 1.

TABLE 3

Lens prescription for the second embodiment with the form presented in FIG. 1.

| Surf | Radius | Thickness | Glass | Diameter |
|---|---|---|---|---|
| OBJ | Infinity | Infinity | | 0.000 |
| STO | Infinity | 3.328 | | 10.336 |
| 2 | −9.324 | 7.711 | Fused silica | 10.922 |
| 3 | −11.524 | 0.133 | | 15.478 |
| 4 | −65.273 | 2.664 | Fused silica | 16.082 |
| 5 | −22.210 | 0.133 | | 16.455 |
| 6 | 25.776 | 4.329 | Fused silica | 16.337 |
| 7 | −31.636 | 0.133 | | 15.849 |
| 8 | 40.754 | 2.997 | Fused silica | 14.618 |
| 9 | −58.040 | 0.133 | | 13.505 |
| 10 | 20.841 | 2.585 | Fused silica | 11.970 |
| 11 | 72.216 | 8.544 | | 10.239 |
| 12 | Infinity | 14.733 | | 6.822 |
| 13 | 116.687 | 13.503 | Fused silica | 45.288 |
| 14 | −773.226 | −13.503 | MIRROR | 37.296 |
| 15 | 116.687 | −14.733 | | 45.288 |
| 16 | 34.726 | 14.733 | MIRROR | 49.284 |
| 17 | 116.687 | 13.503 | Fused silica | 45.288 |
| 18 | −773.226 | 0.333 | | 37.296 |
| IMA | Infinity | | | 1.969 |

Again, the left surface of lens 104 in the orientation presented in FIG. 1 (surface 2 in Table 3) has a radius of curvature of −9.324 mm, a thickness of 7.711 mm, and the rightmost surface (surface 3) has a radius of curvature of −11.524, and is 0.133 from the next surface. The material used is fused silica.

In the lens prescription presented in Table 3, the surfaces corresponding to side 111 and 112 of element 110 are aspheric. The aspheric surface sag for this design is described using Equation (1). The aspheric surface sag parameters for the lens prescription in Table 3 are listed in Table 4.

TABLE 4

Aspheric surface sag parameters for the lens prescription in Table 3.

| | Surf 13, 15, 17 | Surf 14, 18 |
|---|---|---|
| Conic constant (k) | 0 | 0 |
| Maximum half diameter (r) mm | 20.8458 | 16.8498 |
| Curvature (c) 1/mm | 0.008569935 | 0.00129328 |
| $\alpha_1$ | 0 | 0 |
| $\alpha_2$ | −0.33349657 | 0.044100258 |
| $\alpha_3$ | 0.10280759 | 0.12553968 |
| $\alpha_4$ | 1.6277523 | −0.51696726 |
| $\alpha_5$ | −5.367384 | 1.402948 |

TABLE 4-continued

Aspheric surface sag parameters for the
lens prescription in Table 3.

| | Surf 13, 15, 17 | Surf 14, 18 |
|---|---|---|
| $\alpha_6$ | 10.291506 | −2.2668376 |
| $\alpha_7$ | −11.72782 | 2.1510412 |
| $\alpha_8$ | 7.2919332 | −1.1050784 |
| $\alpha_9$ | −1.9117185 | 0.23782993 |

The lens prescription of Table 3 and Table 4 operates at a 266 nm wavelength and has a field size of approximately 2.0 mm. The maximum element diameter is 49 mm which is significantly smaller than many objective designs previously employed with this field size and performance. The small size of this objective is particularly beneficial in view of the performance characteristics of the objective. This ultra-high NA objective supports a numerical aperture of approximately 0.97 in air and a polychromatic wavefront error of less than approximately 0.0358 waves, levels previously unachievable in combination in a single design.

The catadioptric lens prescription listed in Table 3 and Table 4 using aspheric surfaces allows the objective to simultaneously achieve the above performance goals with very loose tolerances, i.e. certain slight imperfections in manufacturing to not critically inhibit performance. The highest sensitivity to a 10 micron element decenter in the focusing group 101 is 0.15 waves at 266 nm without compensation. The highest sensitivity to a 10 micron element decenter for the catadioptric group 103 is 0.29 waves at 266 nm without compensation. The large field size, loose tolerances, low wavefront error, and low number of elements are possible due the use of aspheric surfaces in the catadioptric group.

The lens prescription presented in Table 3 and Table 4 thus uses a single glass material, fused silica. Other materials may be employed in a similar fashion to the design presented in FIG. 1. Re-optimization for other wavelengths requires slight tuning or altering of components, generally within the abilities of those skilled in the art. The lens prescription presented in Table 3 and Table 4 is self corrected in a similar fashion to that presented in Table 1 and Table 2. Also, the ultra-high NA objective design presented herein can support various modes of illumination and imaging as the objective in FIG. 1.

A third embodiment according to the present design with seven separate elements is possible. The form of the objective is similar to that presented in FIG. 1. The major difference between this lens prescription and the lens prescription in Table 1 and Table 2 is optimization for a smaller 1 mm field size. This 1 mm field size enables a reduction in the diameter of the elements and length of the objective as well as an improvement in the optical performance. Table 5 presents the lens prescriptions for this second embodiment having similar form to the design presented in FIG. 1.

TABLE 5

Lens prescription for the third embodiment
with the form presented in FIG. 1.

| Surf | Radius | Thickness | Glass | Diameter |
|---|---|---|---|---|
| OBJ | Infinity | Infinity | | 0.000 |
| STO | Infinity | 1.675 | | 5.140 |
| 2 | −4.827 | 3.821 | Fused silica | 5.451 |
| 3 | −5.694 | 0.066 | | 7.626 |
| 4 | −18.037 | 1.320 | Fused silica | 7.846 |
| 5 | −10.216 | 0.066 | | 8.103 |
| 6 | 13.289 | 2.145 | Fused silica | 8.101 |
| 7 | −15.228 | 0.066 | | 7.890 |
| 8 | 22.382 | 1.485 | Fused silica | 7.327 |
| 9 | −23.426 | 0.066 | | 6.831 |
| 10 | 9.822 | 1.281 | Fused silica | 5.999 |
| 11 | 39.226 | 4.670 | | 5.180 |
| 12 | Infinity | 7.293 | | 3.770 |
| 13 | 61.876 | 6.569 | Fused silica | 22.440 |
| 14 | −378.591 | −6.569 | MIRROR | 18.480 |
| 15 | 61.876 | −7.293 | | 22.440 |
| 16 | 17.243 | 7.293 | MIRROR | 25.000 |
| 17 | 61.876 | 6.569 | Fused silica | 22.440 |
| 18 | −378.591 | 0.300 | | 18.480 |
| IMA | Infinity | | | 0.974 |

In the lens description presented in Table 5, the surfaces corresponding to side 111 and 112 of element 110 are aspheric. The aspheric surface sag for this design is described using Equation (1). The aspheric surface sag parameters for the lens prescription in Table 5 are listed in Table 6.

TABLE 6

Aspheric surface sag parameters for the lens
prescription in Table 5.

| | Surf 13, 15, 17 | Surf 14, 18 |
|---|---|---|
| Conic constant (k) | 0 | 0 |
| Maximum half diameter (r) mm | 10.329 | 8.349 |
| Curvature (c) 1/mm | 0.016161355 | 0.002641373 |
| $\alpha_1$ | 0 | 0 |
| $\alpha_2$ | −0.19292841 | 0.018734052 |
| $\alpha_3$ | 0.10049219 | 0.067411226 |
| $\alpha_4$ | 0.75677149 | −0.25698045 |
| $\alpha_5$ | −2.6318374 | 0.69501409 |
| $\alpha_6$ | 5.1252932 | −1.1248707 |
| $\alpha_7$ | −5.8767006 | 1.0716021 |
| $\alpha_8$ | 3.656835 | −0.55382238 |
| $\alpha_9$ | −0.95949413 | 0.12025512 |

The lens prescription of Table 5 and Table 6 operates at a 266 nm wavelength and has a field size of approximately 1.0 mm. The maximum element diameter is 25 mm, significantly smaller than many objective designs previously employed with this field size and performance. The small size of this objective is particularly beneficial in view of the performance characteristics of the objective. This ultra-high NA objective supports a numerical aperture of approximately 0.97 in air and a polychromatic wavefront error of less than approximately 0.0263 waves, previously unachievable in combination in a single design. Again, field size represents the size of the area on the specimen that can be imaged the system with minimum degradation in optical performance.

The catadioptric lens prescription listed in Table 5 and Table 6 using aspheric surfaces allows the objective to simultaneously achieve the above performance goals with very loose tolerances. The highest sensitivity to a 10 micron element decenter in the focusing group 101 is 0.16 waves at 266 nm without compensation. The highest sensitivity to a 10 micron element decenter for the catadioptric group 103 is 0.27 waves at 266 nm without compensation. The large field size, loose tolerances, low wavefront error, and low number of elements are possible due the use of aspheric surfaces in the catadioptric group.

The lens prescription presented in Table 5 and Table 6 thus uses a single glass material, fused silica. Other materials may be employed in a similar fashion to the design presented in FIG. 1. Re-optimization for other wavelengths requires slight tuning or altering of components, and may generally be within the abilities of those skilled in the art. The lens prescription presented in Table 5 and Table 6 is self corrected in a similar fashion to that presented in Table 1 and Table 2. Also, the ultra-high NA objective design presented herein can support various modes of illumination and imaging as the objective in FIG. 1.

A fourth embodiment according to the present design with seven separate elements is possible. The form of the objective is again similar to that presented in FIG. 1. The first major difference between this lens prescription and the lens prescription in Table 1 and Table 2 is the optimization for a smaller 2 mm field size. Such optimization enables the reduction in the diameter of the elements and length of the objective as well as an improvement in the optical performance. Further, side 112 of element 110 is spherical while the surface of the mirror corresponding to element 109 in FIG. 1 is aspheric. This spherical side/aspheric mirror combination can simplify the alignment of the two aspheric surfaces because they are on physically separate elements. Table 7 presents the lens prescriptions for the second embodiment with similar form to that presented in FIG. 1.

TABLE 7

Lens prescription for the fourth embodiment with the form presented in FIG. 1.

| Surf | Radius | Thickness | Glass | Diameter |
|---|---|---|---|---|
| OBJ | Infinity | Infinity | | 0.000 |
| STO | Infinity | 3.284 | | 10.280 |
| 2 | −8.800 | 7.792 | Fused silica | 10.812 |
| 3 | −11.116 | 0.132 | | 15.547 |
| 4 | −22.742 | 2.640 | Fused silica | 15.954 |
| 5 | −16.011 | 0.132 | | 16.641 |
| 6 | 24.931 | 4.290 | Fused silica | 16.649 |
| 7 | −22.794 | 0.132 | | 16.338 |
| 8 | 23.980 | 2.970 | Fused silica | 14.046 |
| 9 | 170.277 | 0.132 | | 12.483 |
| 10 | 15.982 | 2.545 | Fused silica | 11.229 |
| 11 | 28.948 | 7.484 | | 9.242 |
| 12 | Infinity | 14.051 | | 6.000 |
| 13 | 63.201 | 11.607 | Fused silica | 41.000 |
| 14 | Infinity | −11.607 | MIRROR | 36.000 |
| 15 | 63.201 | −14.051 | | 41.000 |
| 16 | 32.545 | 14.051 | MIRROR | 46.000 |
| 17 | 63.201 | 11.607 | Fused silica | 41.000 |
| 18 | Infinity | 0.600 | | 36.000 |
| IMA | Infinity | | | 1.974 |

In the lens prescription presented in Table 7, the surfaces corresponding to side 111 of element 110 and the reflecting surface of the mirror corresponding to mirror 109 in FIG. 1 are aspheric, while side 112 is spherical. The aspheric surface sag for this design is again represented by Equation (1), where aspheric surface sag parameters for the lens prescription in Table 7 are listed in Table 8.

TABLE 8

Aspheric surface sag parameters for the lens prescription in Table 7.

| | Surf 13, 15, 17 | Surf 16 |
|---|---|---|
| Conic constant (k) | 0 | 0 |
| Maximum half diameter (r) mm | 20.658 | 23 |
| Curvature (c) 1/mm | 0.015822535 | 0.03072669 |
| $\alpha_1$ | 0 | 0 |
| $\alpha_2$ | −0.79063858 | −0.11381664 |
| $\alpha_3$ | 0.37861274 | −0.15655664 |
| $\alpha_4$ | 0.2935179 | 0.12568966 |
| $\alpha_5$ | −0.99613306 | −0.33080738 |
| $\alpha_6$ | 3.9759503 | −0.39646804 |
| $\alpha_7$ | −9.6653947 | 1.5950597 |
| $\alpha_8$ | 10.769708 | −1.7974748 |
| $\alpha_9$ | −4.6516076 | 0.69905777 |

The lens prescription of Table 7 and Table 8 operates at a 266 nm wavelength and has a field size of approximately 2.0 mm. The maximum element diameter is 46 mm, again significantly smaller than many objective designs previously employed with this field size and level of performance. The small size of this objective is particularly beneficial in view of the performance characteristics of the objective. This ultra-high NA objective supports a numerical aperture of approximately 0.97 in air and a polychromatic wavefront error of less than approximately 0.0358 waves, previously unachievable in combination in a single design.

The catadioptric lens prescription listed in Table 7 and Table 8 using aspheric surfaces allows the objective to simultaneously achieve the above performance goals with very loose tolerances. The highest sensitivity to a 10 micron element decenter in the focusing group 101 is 0.16 waves at 266 nm without compensation. The highest sensitivity to a 10 micron element decenter for the catadioptric group 103 is 0.41 waves at 266 nm without compensation. The large field size, loose tolerances, low wavefront error, and low number of elements are possible due the use of aspheric surfaces in the catadioptric group.

The lens prescription presented in Table 7 and Table 8 thus uses a single glass material, fused silica. Other materials may be employed in a similar fashion to the design presented in FIG. 1. Re-optimization for other wavelengths requires slight tuning or altering of components, and may generally be within the abilities of those skilled in the art. The lens prescription presented in Table 7 and Table 8 is self corrected in a similar fashion to that presented in Table 1 and Table 2. Also, the ultra-high NA objective design presented herein can support various modes of illumination and imaging as the objective in FIG. 1.

A fifth embodiment according to the present design with seven separate elements is possible. The form of the objective is very similar to that presented in FIG. 1. The major difference between this lens prescription and the lens prescription in Table 1 and Table 2 is the use of aspheric surfaces to improve the performance and reduce assembly tolerances. In this objective, the side 111 and 112 of element 110 are aspheric and the surface of the mirror element corresponding to mirror element 109 of FIG. 1 is aspheric. Table 9 presents the lens prescriptions for the second embodiment with similar form to that presented in FIG. 1.

TABLE 9

Lens prescription for the fifth embodiment with the form presented in FIG. 1.

| Surf | Radius | Thickness | Glass | Diameter |
|---|---|---|---|---|
| OBJ | Infinity | Infinity | | 0.000 |
| STO | Infinity | 4.997 | | 15.520 |
| 2 | −14.000 | 11.579 | Fused silica | 16.398 |
| 3 | −17.304 | 0.200 | | 23.238 |
| 4 | −98.007 | 4.000 | Fused silica | 24.143 |
| 5 | −33.349 | 0.200 | | 24.703 |
| 6 | 38.703 | 6.500 | Fused silica | 24.525 |
| 7 | −47.501 | 0.200 | | 23.791 |
| 8 | 61.192 | 4.500 | Fused silica | 21.944 |
| 9 | −87.147 | 0.200 | | 20.272 |
| 10 | 31.292 | 3.881 | Fused silica | 17.969 |
| 11 | 108.432 | 12.900 | | 15.369 |
| 12 | Infinity | 21.880 | | 10.328 |
| 13 | 183.104 | 20.908 | Fused silica | 68.000 |
| 14 | −1051.110 | −20.908 | MIRROR | 56.000 |
| 15 | 183.104 | −21.880 | | 68.000 |
| 16 | 52.456 | 21.880 | MIRROR | 74.000 |
| 17 | 183.104 | 20.908 | Fused silica | 68.000 |
| 18 | −1051.110 | 0.500 | | 56.000 |
| IMA | Infinity | | | 2.958 |

In the lens prescription presented in Table 9, the surfaces corresponding to side 111 and 112 of element 110 are aspheric. In addition, the surface of the mirror element corresponding to mirror element 109 of FIG. 1 is aspheric. The aspheric surface sags for this design are described using Equation (1). The aspheric surface sag parameters for the lens prescription in Table 9 are listed in Table 10.

TABLE 10

Aspheric surface sag parameters for the lens prescription in Table 9.

| | Surf 13, 15, 17 | Surf 14, 18 | Surf 16 |
|---|---|---|---|
| Conic constant (k) | 0 | 0 | 0 |
| Maximum half diameter (r) mm | 31.3 | 25.3 | 37 |
| Curvature (c) 1/mm | 0.00546138 | −0.00095138 | 0.019063596 |
| $\alpha_1$ | 0 | 0 | 0 |
| $\alpha_2$ | −0.44351177 | 0.081814842 | −0.005774473 |
| $\alpha_3$ | 0.50472161 | 0.06052803 | 0.092513606 |
| $\alpha_4$ | 0.55022463 | −0.19324854 | −0.55520303 |
| $\alpha_5$ | −3.391352 | 0.46109576 | 1.9775959 |
| $\alpha_6$ | 8.0140763 | −0.69930724 | −4.0982264 |
| $\alpha_7$ | −10.33446 | 0.64495219 | 5.0002328 |
| $\alpha_8$ | 7.0244667 | −0.32352695 | −3.3017487 |
| $\alpha_9$ | −1.9852477 | 0.067483023 | 0.91645436 |

The lens prescription of Table 9 and Table 10 operates at a 266 nm wavelength and has a field size of approximately 3.0 mm. The maximum element diameter is 74 mm which is significantly smaller than many objective designs previously employed with this field size and performance. The small size of this objective is particularly beneficial in view of the performance characteristics of the objective. This ultra-high NA objective supports a numerical aperture of approximately 0.97 in air and a polychromatic wavefront error of less than approximately 0.0407 waves, levels which had been previously unachievable in combination in a single design. Field size in this arrangement represents the size of the area on the specimen that can be imaged the system with minimum degradation in optical performance.

The catadioptric lens prescription listed in Table 9 and Table 10 using aspheric surfaces allows the objective to simultaneously achieve the above performance goals and be constructed using very loose tolerances. The highest sensitivity to a 10 micron element decenter in the focusing group 101 is 0.15 waves at 266 nm without compensation. The highest sensitivity to a 10 micron element decenter for the catadioptric group 103 is 0.28 waves at 266 nm without compensation. The large field size, loose tolerances, low wavefront error, and low number of elements are possible due the use of aspheric surfaces in the catadioptric group.

The lens prescription presented in Table 9 and Table 10 thus uses a single glass material, fused silica. Other materials may be employed in a similar fashion to the design presented in FIG. 1. Re-optimization for other wavelengths requires slight tuning or altering of components, and may generally be within the abilities of those skilled in the art. The lens prescription presented in Table 9 and Table 10 is self corrected in a similar fashion to that presented in Table 1 and Table 2. Also, the ultra-high NA objective design presented herein can support various modes of illumination and imaging as the objective in FIG. 1.

Figure 2:
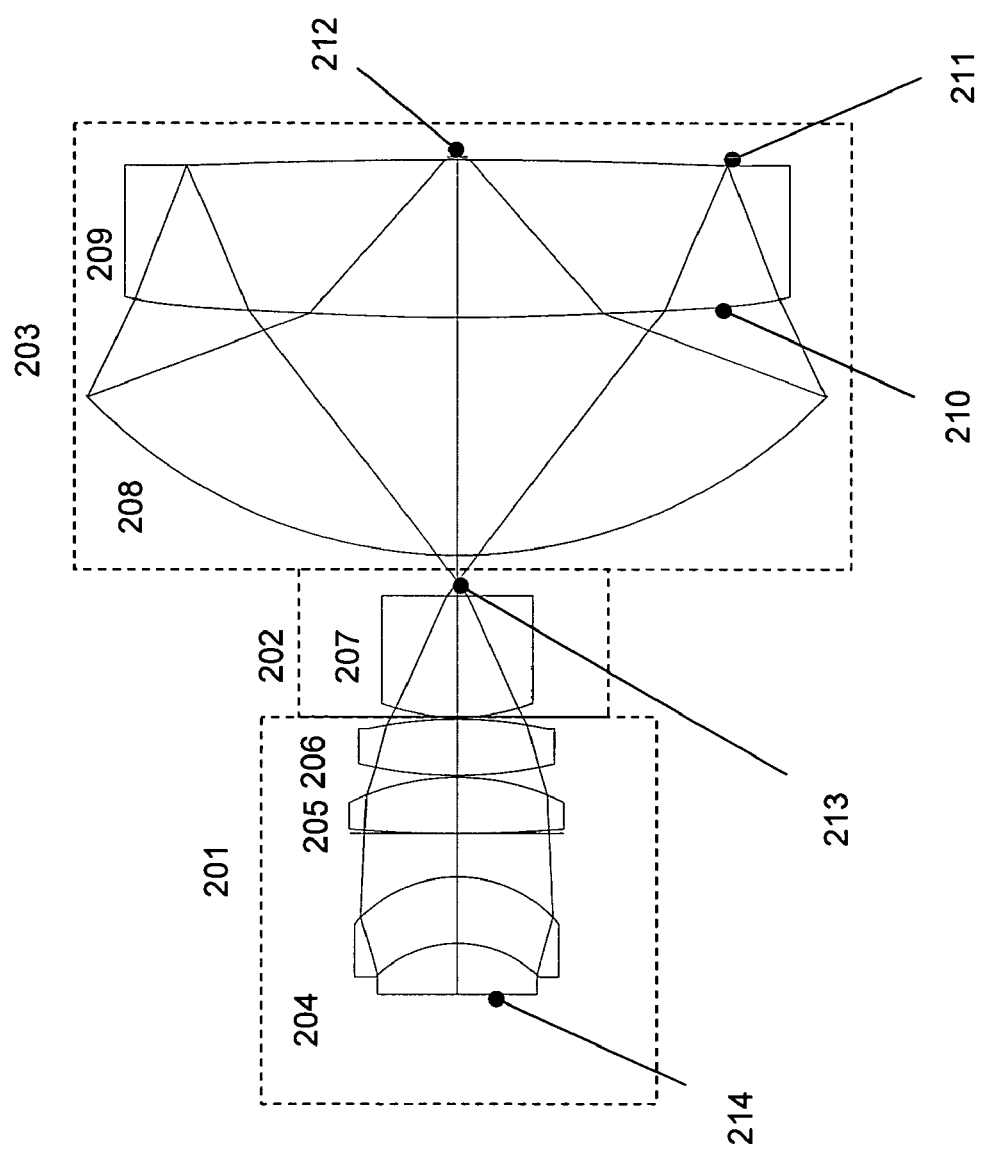
FIG. 2 presents an aspheric objective design generally optimized for a wavelength of 355 nm and smaller 2.5 mm field size.

FIG. 2 illustrates a sixth embodiment according to the present design. The design comprises a focusing lens group 201 a field lens group 202 and a catadioptric group 203. The focusing lens group 201 includes lenses 204-206. Intermediate image 213 is formed by first lens group 201. This design includes a field lens 207 in proximity to the intermediate image 213. The intermediate image 213 is formed in proximity to the vertex of the spherical mirror 208 in catadioptric group 203. The catadioptric group comprises two elements including a spherical mirror 208 and a mangin element 209. In this design, sides 210 and 211 of the Mangin element 209 are aspheric.

The major difference between this lens prescription and the lens prescription in Table 1 and Table 2 is the optimization for a wavelength of 355 nm and a smaller 2.5 mm field size. This enables the reduction in the diameter of the elements and length of the objective as well as an improvement in the optical performance. It is also possible to reduce the number of optical elements from seven to six. Table 11 presents the lens prescriptions for the sixth embodiment presented in FIG. 2.

TABLE 11

Lens prescription for the sixth embodiment presented in FIG. 2.

| Surf | Radius | Thickness | Glass | Diameter |
|---|---|---|---|---|
| OBJ | Infinity | Infinity | | 0.000 |
| STO | Infinity | 4.997 | | 15.520 |
| 2 | −13.598 | 12.124 | Fused silica | 16.241 |
| 3 | −16.451 | 0.635 | | 22.941 |
| 4 | 231.631 | 6.500 | Fused silica | 23.719 |
| 5 | −26.419 | 0.200 | | 23.921 |
| 6 | 51.658 | 6.000 | Fused silica | 22.113 |
| 7 | −43.517 | 0.200 | | 20.582 |
| 8 | 23.811 | 6.151 | Fused silica | 17.518 |
| 9 | 97.293 | 10.000 | | 13.179 |
| 10 | Infinity | 23.436 | | 6.857 |
| 11 | 145.336 | 18.928 | Fused silica | 65.000 |
| 12 | 56074.000 | −18.928 | MIRROR | 56.000 |
| 13 | 145.336 | −23.436 | | 65.000 |
| 14 | 51.207 | 23.436 | MIRROR | 75.000 |
| 15 | 145.336 | 18.928 | Fused silica | 65.000 |
| 16 | 56074.000 | 0.300 | | 56.000 |
| IMA | Infinity | | | 2.474 |

In the lens prescription presented in Table 11, the surfaces corresponding to side 210 and 211 of element 209 are aspheric. The aspheric surface sag for this design can be described using Equation (1), where the aspheric surface sag parameters for the lens prescription in Table 11 are listed in Table 12.

TABLE 12

Aspheric surface sag parameters for the lens prescription in Table 11.

| | Surf 11, 13, 15 | Surf 12, 16 |
|---|---|---|
| Conic constant (k) | 0 | 0 |
| Maximum half diameter (r) mm | 31.3 | 25.3 |
| Curvature (c) 1/mm | 0.006880607 | 1.78E−05 |
| $\alpha_1$ | 0 | 0 |
| $\alpha_2$ | −1.3986391 | −0.049805596 |
| $\alpha_3$ | 0.99451172 | 0.096981315 |
| $\alpha_4$ | −1.3354642 | −0.32884171 |
| $\alpha_5$ | 3.5074638 | 1.0110895 |
| $\alpha_6$ | −5.7414666 | −1.8724779 |
| $\alpha_7$ | 5.3273387 | 2.0434844 |
| $\alpha_8$ | −2.5099454 | −1.1999038 |
| $\alpha_9$ | 0.44668614 | 0.294698 |

In the design presented in Table 11 and Table 12, the numerical aperture may approach or even exceed approximately 0.97 in air. From FIG. 2, the focusing lens group 201 has the ability to receive light energy and transmit focused light energy. Field lens group 202 has the ability to receive intermediate light energy and transmit intermediate light energy. The catadioptric group or Mangin mirror arrangement 203 receives the intermediate energy and provides controlled light energy to the specimen 212. Alternately, the reflected path originates at the specimen, and light reflected from the specimen is received by the catadioptric group or Mangin mirror arrangement 203 and forms and transmits reflected light energy 213. The field lens group 202 receives intermediate light energy and retransmits intermediate light energy. The focusing lens group receives resultant light energy and transmits focused resultant light energy. An aperture or mask can be placed at the aperture stop 214 to limit or modify the NA of the objective.

The lens prescription of Tables 11 and 12 operates at a 355 nm wavelength and has a field size of approximately 2.5 mm. The maximum element diameter is 75 mm, again significantly smaller than many objective designs previously employed with this field size and performance. The small size of this objective is particularly beneficial in view of the performance characteristics of the objective. This ultra-high NA objective supports a numerical aperture of approximately 0.97 in air and a polychromatic wavefront error of less than approximately 0.0438 waves, again a high previously unachieved performance level for a single objective design.

The catadioptric lens prescription listed in Tables 11 and 12 using aspheric surfaces allows the objective to simultaneously achieve the above performance goals with very loose tolerances. The highest sensitivity to a 10 micron element decenter in the focusing group 201 is 0.13 waves at 355 nm without compensation. The highest sensitivity to a 10 micron element decenter in the field lens group 202 is approximately 0.18 waves at 355 nm without compensation. The highest sensitivity to a 10 micron element decenter for the catadioptric group 203 is 0.18 waves at 355 nm without compensation.

The lens prescription presented in Tables 11 and 12 thus uses a single glass material, fused silica. Other materials may be employed in a similar fashion to the design presented in FIG. 1. Re-optimization for other wavelengths requires slight tuning or altering of components, and may generally be within the abilities of those skilled in the art. The lens prescription presented in Tables 11 and 12 is self corrected in a similar fashion to that presented in Tables 1 and 2. Also, the ultra-high NA objective design presented herein can support various modes of illumination and imaging as the objective in FIG. 1.

Figure 3:
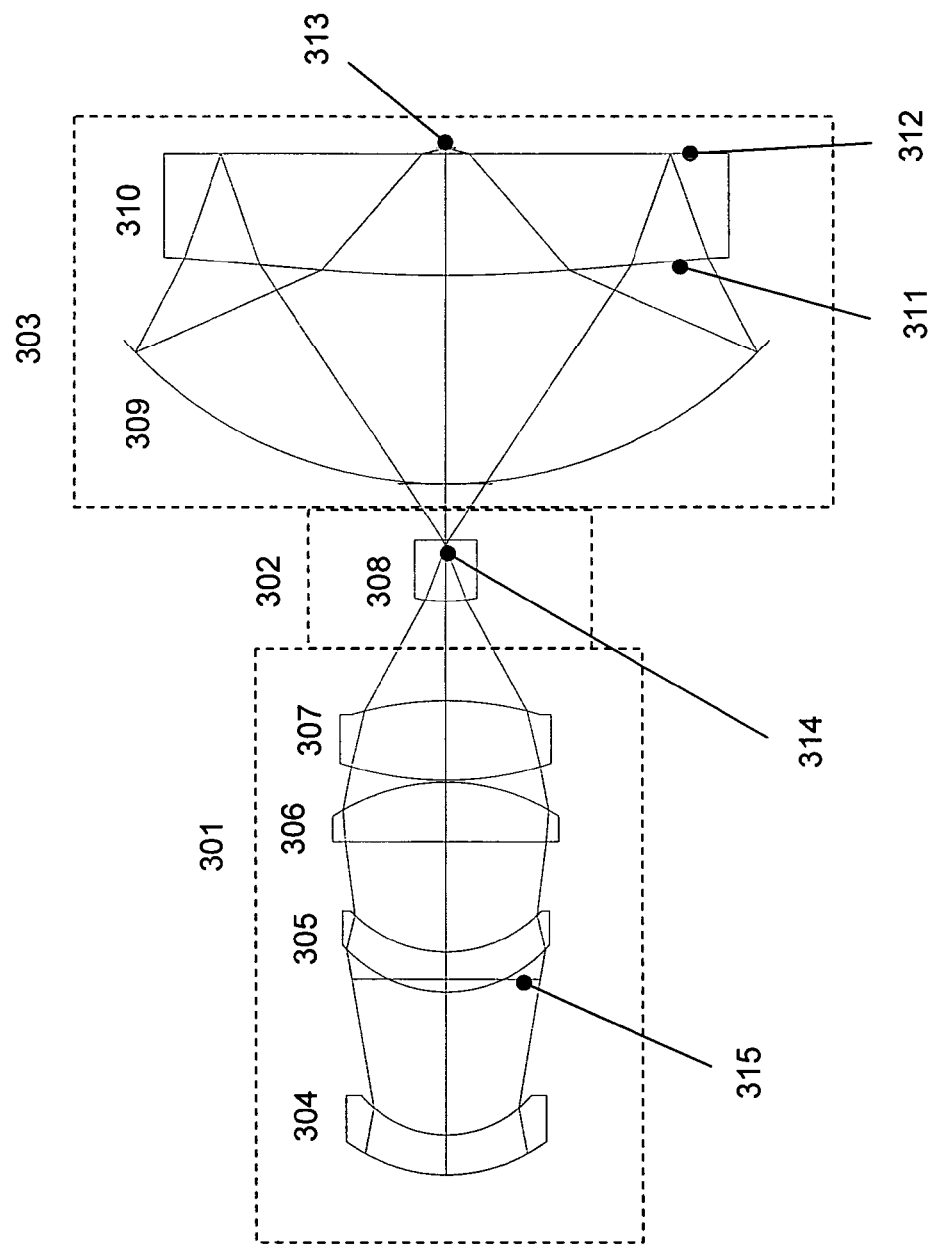
FIG. 3 is an aspheric objective design generally optimized for a smaller 1.0 mm field size using a single aspheric surface.

FIG. 3 illustrates a seventh embodiment according to the present design. The design of FIG. 3 comprises a focusing lens group 301, a field lens group 302, and a catadioptric group 303. The focusing lens group 301 includes lenses 304-307. Intermediate image 314 is formed by first lens group 301. This design includes a field lens 308 in proximity to the intermediate image 314. The intermediate image 314 is formed in proximity to the vertex of the spherical mirror 309 in catadioptric group 303. The catadioptric group comprises two elements including a spherical mirror 309 and a Mangin element 310. In this design, side 311 of the Mangin element 310 is aspheric. Side 312 is flat, and light energy passes to specimen 313.

The major difference between this lens prescription and the lens prescription in Tables 1 and 2 is the optimization for a smaller 11.0 mm field size and the use of only a single aspheric surface. This aspheric surface enables the reduction in the diameter of the elements and length of the objective as well as an improvement in the optical performance. Using an element with a single aspheric surface on one side and a flat surface on the other can simplify manufacturing of the aspheric element. Table 13 presents the lens prescriptions for the embodiment presented in FIG. 3.

TABLE 13

Lens prescription for the seventh embodiment presented in FIG. 3.

| Surf | Radius | Thickness | Glass | Diameter |
|---|---|---|---|---|
| OBJ | Infinity | Infinity | | 0.000 |
| 1 | 8.210 | 2.000 | Fused silica | 9.955 |
| 2 | 5.473 | 7.827 | | 8.481 |
| STO | Infinity | −0.634 | | 9.400 |
| 4 | 6.814 | 2.000 | Fused silica | 10.279 |
| 5 | 6.524 | 5.553 | | 9.524 |
| 6 | 1737.320 | 3.000 | Fused silica | 10.923 |
| 7 | −10.069 | 0.100 | | 11.256 |
| 8 | 16.430 | 4.000 | Fused silica | 10.496 |
| 9 | −16.430 | 4.998 | | 9.494 |
| 10 | 8.244 | 3.058 | Fused silica | 3.111 |
| 11 | 44.814 | 2.853 | | 1.768 |
| 12 | Infinity | 10.511 | | 4.779 |
| 13 | 64.268 | 6.130 | Fused silica | 28.000 |
| 14 | Infinity | −6.130 | MIRROR | 28.000 |
| 15 | 64.268 | −10.511 | | 28.000 |
| 16 | 21.220 | 10.511 | MIRROR | 32.000 |
| 17 | 64.268 | 6.130 | Fused silica | 28.000 |
| 18 | Infinity | 0.300 | | 28.000 |
| IMA | Infinity | | | 1.004 |

In the lens prescription presented in Table 13, the surface corresponding to side 311 of element 310 is aspheric. The aspheric surface sag for this design is again described using Equation (1). The aspheric surface sag parameters for the lens prescription in Table 13 are listed in Table 14.

TABLE 14

Aspheric surface sag parameters for the lens prescription in Table 13.

| | Surf 13, 15, 17 |
|---|---|
| Conic constant (k) | 0 |
| Maximum half diameter (r) mm | 14 |
| Curvature (c) 1/mm | 0.01555984 |
| $\alpha_1$ | 0 |

TABLE 14-continued

Aspheric surface sag parameters for the
lens prescription in Table 13.

| | Surf 13, 15, 17 |
|---|---|
| $\alpha_2$ | -0.90705711 |
| $\alpha_3$ | 0.39929176 |
| $\alpha_4$ | 0.60763285 |
| $\alpha_5$ | -2.8020073 |
| $\alpha_6$ | 5.9400883 |
| $\alpha_7$ | -7.7062308 |
| $\alpha_8$ | 5.554214 |
| $\alpha_9$ | -1.7341973 |

In the design presented in Tables 13 and 14, the numerical aperture may approach or even exceed approximately 0.97 in air. From FIG. 3, the focusing lens group 301 has the ability to receive light energy and transmit focused light energy. Field lens group 302 has the ability to receive intermediate light energy and transmit intermediate light energy. The catadioptric group or Mangin mirror arrangement 303 receives the intermediate energy and provides controlled light energy to the specimen 314. Alternately, the reflected path originates at the specimen, and light reflected from the specimen is received by the catadioptric group or Mangin mirror arrangement 303 and forms and transmits reflected light energy 314. The field lens group 302 receives intermediate light energy and retransmits intermediate light energy. The focusing lens group receives resultant light energy and transmits focused resultant light energy. An aperture or mask can be placed at the aperture stop 315 to limit or modify the NA of the objective.

The lens prescription of Tables 13 and 14 operates at a 266 nm wavelength and has a field size of approximately 1.0 mm. The maximum element diameter is 32 mm which is significantly smaller than many objective designs previously employed with this field size and performance. This ultra-high NA objective supports a numerical aperture of approximately 0.97 in air and a polychromatic wavefront error of less than approximately 0.05 waves, levels which had been previously unachievable in combination in a single design.

The catadioptric lens prescription listed in Tables 13 and 14 using one aspheric surface allows the objective to simultaneously achieve the above performance goals with loose tolerances. The highest sensitivity to a 10 micron element decenter in the focusing group 301 is 0.4 waves at 266 nm without compensation. The highest sensitivity to a 10 micron element decenter in the field lens group 302 is 0.3 waves at 266 nm without compensation. The highest sensitivity to a 10 micron element decenter for the catadioptric group 303 is 0.28 waves at 266 nm without compensation. The large field size, loose tolerances, low wavefront error, and low number of elements are possible due the use of one aspheric surface in the catadioptric group.

The lens prescription presented in Tables 13 and 14 thus uses a single glass material, fused silica. Other materials may be employed in a similar fashion to the design presented in FIG. 1. Re-optimization for other wavelengths requires slight tuning or altering of components, and may generally be within the abilities of those skilled in the art. The lens prescription presented in Tables 13 and 14 is self corrected in a similar fashion to that presented in Tables 1 and 2. Also, the ultra-high NA objective design presented herein can support various modes of illumination and imaging as the objective in FIG. 1.

Figure 4:
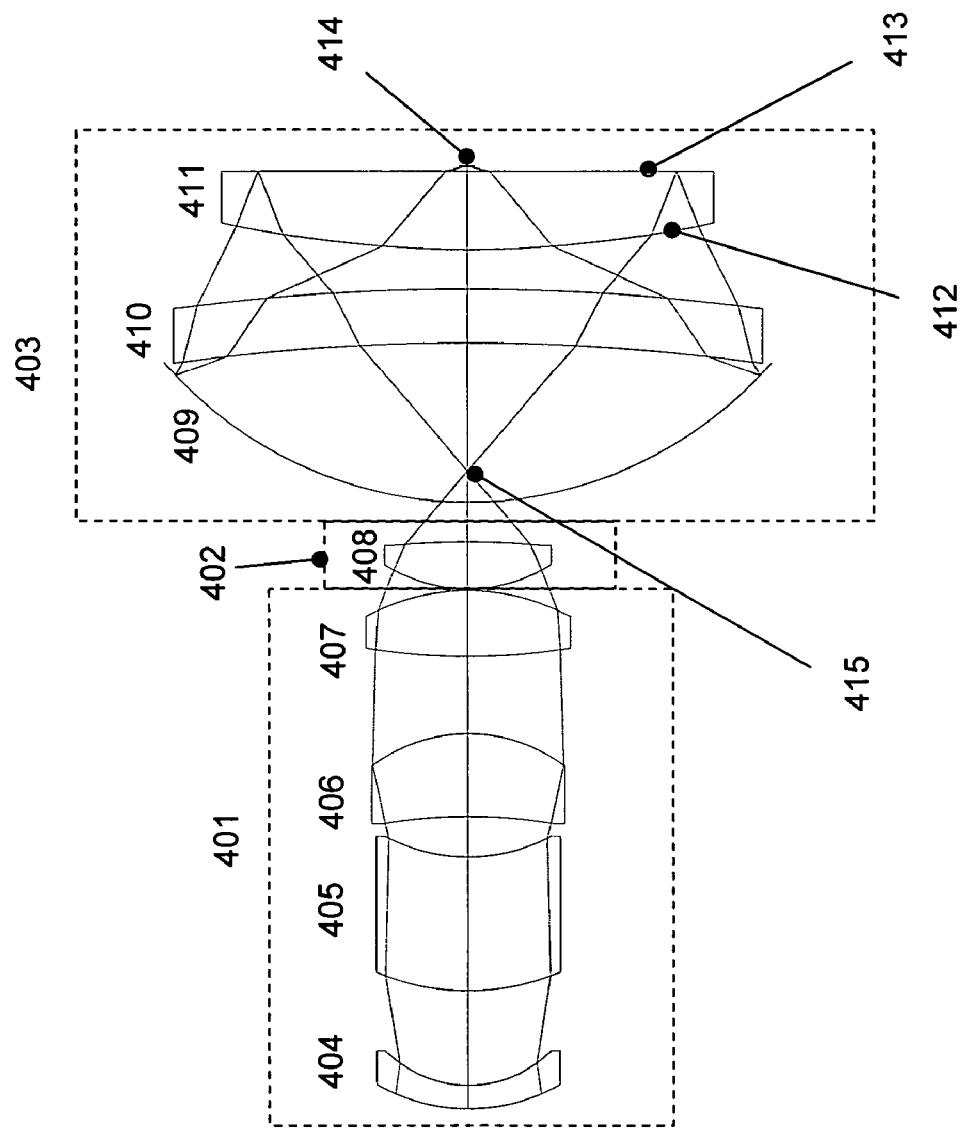
FIG. 4 shows an aspheric objective design optimized for a smaller 0.8 mm field size using a single aspheric surface.

FIG. 4 illustrates an eighth embodiment according to the present design that uses eight separate elements. The design comprises a focusing lens group 401, a field lens group 402, and a catadioptric group 403. The focusing lens group 401 includes lenses 404-407. Intermediate image 415 is formed by first lens group 401. The design further includes field lens 408 between the focusing lens group 401 and the intermediate image 415. The intermediate image 415 is formed in proximity to the vertex of the spherical mirror 409 in catadioptric group 403. The catadioptric group comprises three elements including a spherical mirror 409, lens element 410 used in triple pass, and a mangin element 411. The three element arrangement for the catadioptric group 403 places the lens 410 between the spherical mirror 409 and the Mangin element 411. This lens 410 is shaped as a meniscus element toward the spherical mirror 409. The side 412 of Mangin element 411 is aspheric while side 413 remains spherical or flat.

The major difference between this lens prescription and the lens prescription in Table 1 and Table 2 is the optimization for a smaller 0.8 mm field size and the use of only a single aspheric surface. In addition a meniscus lens is added within the catadioptric cavity to reduce the aberration correction requirements of the aspheric surface. This enables the reduction in the diameter of the elements and length of the objective and can improve optical performance. Using an element with a single aspheric surface on one side and a flat surface on the other can significantly simplify manufacturing of the aspheric element. Table 15 presents the lens prescriptions for the eighth embodiment presented in FIG. 4.

TABLE 15

Lens prescription for the eighth embodiment
presented in FIG. 4.

| Surf | Radius | Thickness | Glass | Diameter |
|---|---|---|---|---|
| OBJ | Infinity | Infinity | | 0.000 |
| STO | Infinity | -10.846 | | 7.760 |
| 2 | 10.411 | 1.250 | Fused silica | 9.690 |
| 3 | 6.113 | 5.085 | | 8.801 |
| 4 | 10.733 | 7.146 | Fused silica | 9.974 |
| 5 | 9.047 | 2.173 | | 8.813 |
| 6 | -25.411 | 4.426 | Fused silica | 9.000 |
| 7 | -8.568 | 4.117 | | 10.222 |
| 8 | 18.046 | 3.500 | Fused silica | 10.796 |
| 9 | -12.073 | 0.100 | | 10.588 |
| 10 | 8.421 | 2.500 | Fused silica | 8.594 |
| 11 | -47.383 | 2.138 | | 7.520 |
| 12 | Infinity | 8.550 | | 3.474 |
| 13 | -104.530 | 2.250 | Fused silica | 31.000 |
| 14 | -107.086 | 2.039 | | 31.000 |
| 15 | 53.086 | 4.427 | Fused silica | 26.000 |
| 16 | Infinity | -4.427 | MIRROR | 26.000 |
| 17 | 53.086 | -2.039 | | 26.000 |
| 18 | -107.086 | -2.250 | Fused silica | 31.000 |
| 19 | -104.530 | -8.550 | | 31.000 |
| 20 | 20.485 | 8.550 | MIRROR | 32.000 |
| 21 | -104.530 | 2.250 | Fused silica | 31.000 |
| 22 | -107.086 | 2.039 | | 31.000 |
| 23 | 53.086 | 4.427 | Fused silica | 26.000 |
| 24 | Infinity | 0.300 | | 3.567 |
| IMA | Infinity | | | 0.822 |

In the lens prescription presented in Table 15, the surface corresponding to side 412 of element 411 is aspheric. The aspheric surface sag for this design is again as described in Equation (1). The aspheric surface sag parameters for the lens prescription in Table 15 are listed in Table 16.

TABLE 16

Aspheric surface sag parameters for the lens prescription in Table 15.

|  | Surf 15, 17, 23 |
|---|---|
| Conic constant (k) | 0 |
| Maximum half diameter (r) mm | 13 |
| Curvature (c) 1/mm | 0.018837358 |
| $\alpha_1$ | 0 |
| $\alpha_2$ | −0.6780173 |
| $\alpha_3$ | 0.4888971 |
| $\alpha_4$ | 1.1306382 |
| $\alpha_5$ | −5.4378977 |
| $\alpha_6$ | 11.498947 |
| $\alpha_7$ | −13.692366 |
| $\alpha_8$ | 8.8128736 |
| $\alpha_9$ | −2.3621491 |

In the design presented in Table 15 and Table 16, the numerical aperture may approach or even exceed approximately 0.97 in air. From FIG. 4, the focusing lens group 401 has the ability to receive light energy and transmit focused light energy. Field lens group 402 has the ability to receive intermediate light energy and transmit intermediate light energy. The catadioptric group or Mangin mirror arrangement 403 receives the intermediate energy and provides controlled light energy to the specimen 414. Alternately, the reflected path originates at the specimen, and light reflected from the specimen is received by the catadioptric group or Mangin mirror arrangement 403 and transmits reflected light energy and forms intermediate light energy. The field lens group 402 receives intermediate light energy and retransmits intermediate light energy. The focusing lens group receives resultant light energy and transmits focused resultant light energy. An aperture or mask can be placed at the aperture stop (not shown) to limit or modify the NA of the objective.

The lens prescription of Tables 15 and 16 operates at a 355 nm wavelength and has a field size of approximately 0.8 mm. The maximum element diameter is 32 mm, again significantly smaller than many objective designs previously employed with this field size and performance. The small size of this objective is particularly beneficial in view of the performance characteristics of the objective. This ultra-high NA objective supports a numerical aperture of approximately 0.97 in air and a polychromatic wavefront error of less than approximately 0.0324 waves.

The catadioptric lens prescription listed in Tables 15 and 16 using one aspheric surface allows the objective to simultaneously achieve performance goals with loose tolerances. The highest sensitivity to a 10 micron element decenter in the focusing group 401 is 0.29 waves at 355 nm without compensation. The highest sensitivity to a 10 micron element decenter in the field lens group 402 is 0.15 waves at 355 nm without compensation. The highest sensitivity to a 10 micron element decenter for the catadioptric group 403 is 0.33 waves at 355 nm without compensation. The large field size, loose tolerances, low wavefront error, and low number of elements are possible due the use of one aspheric surface in the catadioptric group.

The lens prescription presented in Tables 15 and 16 thus uses a single glass material, fused silica. Other materials may be employed in a similar fashion to the design presented in FIG. 1. Re-optimization for other wavelengths requires slight tuning or altering of components, and may generally be within the abilities of those skilled in the art. The lens prescription presented in Tables 15 and 16 is self corrected in a similar fashion to that presented in Tables 1 and 2. Also, the ultra-high NA objective design presented herein can support various modes of illumination and imaging as the objective in FIG. 1.

Figure 5:
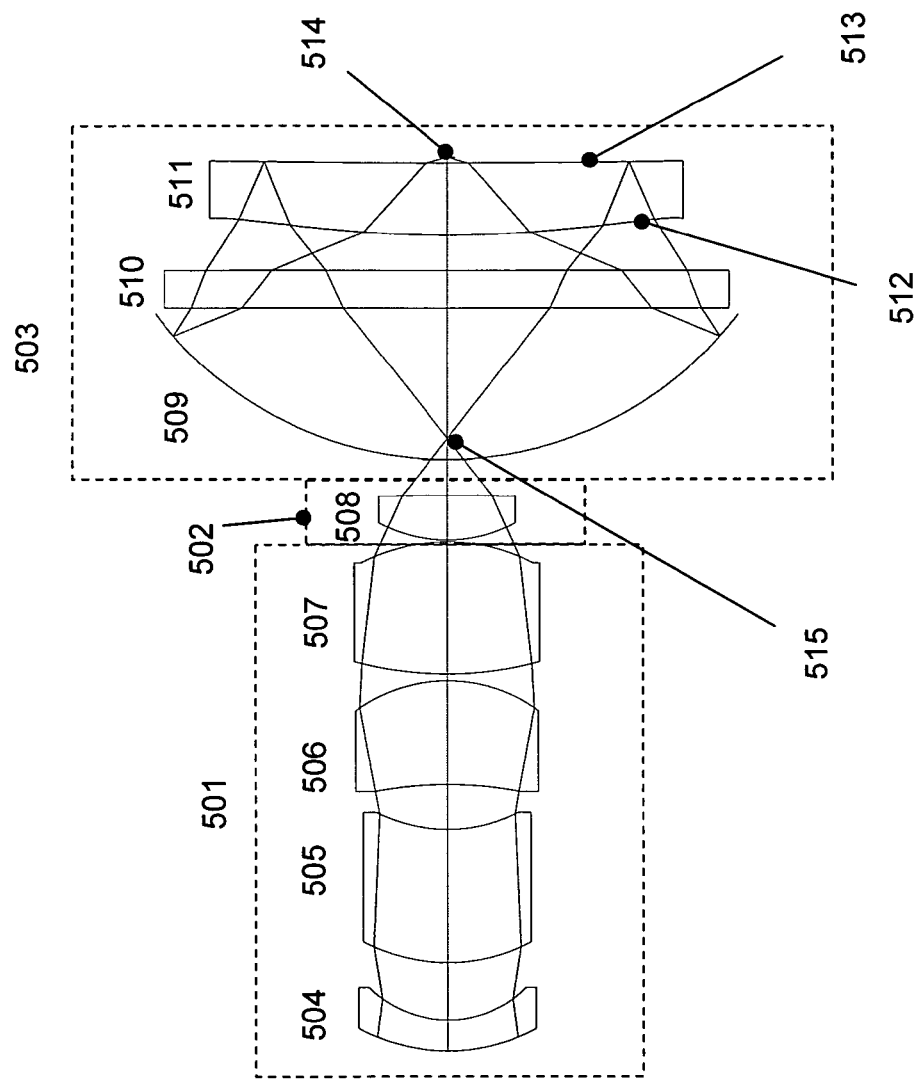
FIG. 5 represents an aspheric objective design using a near plane parallel element within the catadioptric cavity to reduce the aberration correction requirements of the aspheric surface.

FIG. 5 illustrates a ninth embodiment according to the present design that uses eight separate elements. The design comprises a focusing lens group 501, a field lens group 502, and a catadioptric group 503. The focusing lens group 501 includes lenses 504-507. Intermediate image 515 is formed by first lens group 501. The design further includes field lens 508 between the focusing lens group 501 and the intermediate image 515. The intermediate image 515 is formed in proximity to the vertex of the spherical mirror 509 in catadioptric group 503. The catadioptric group comprises three elements including a spherical mirror 509, lens element 510 used in triple pass, and a mangin element 511. The three element arrangement for the catadioptric group 503 places the lens 510 between the spherical mirror 509 and the Mangin element 511. This lens is shaped as a planar or nominally planar parallel element. The side 512 of Mangin element 511 is aspheric while side 513 remains spherical or flat.

The major difference between this lens prescription and the lens prescription in Tables 1 and 2 is the optimization for a smaller 0.8 mm field size and the use of only a single aspheric surface. In addition, a planar or near planar parallel element is added within the catadioptric cavity to reduce the aberration correction requirements of the aspheric surface. This planar or near planar element enables the reduction in the diameter of the elements and length of the objective as well as an improvement in the optical performance. Using an element with a single aspheric surface on one side and a flat surface on the other will simplify manufacturing of the aspheric element. Table 17 presents the lens prescriptions for the eighth embodiment presented in FIG. 5.

TABLE 17

Lens prescription for the sixth embodiment presented in FIG. 5.

| Surf | Radius | Thickness | Glass | Diameter |
|---|---|---|---|---|
| OBJ | Infinity | Infinity |  | 0.000 |
| STO | Infinity | −11.372 |  | 7.760 |
| 2 | 10.129 | 1.750 | Fused silica | 9.783 |
| 3 | 6.070 | 3.203 |  | 8.678 |
| 4 | 9.791 | 7.456 | Fused silica | 9.233 |
| 5 | 8.526 | 2.500 |  | 7.803 |
| 6 | −20.783 | 5.786 | Fused silica | 8.034 |
| 7 | −8.420 | 0.378 |  | 10.066 |
| 8 | 19.300 | 7.401 | Fused silica | 10.224 |
| 9 | −10.101 | 0.100 |  | 9.465 |
| 10 | 7.855 | 2.500 | Fused silica | 7.540 |
| 11 | −145.714 | 2.000 |  | 6.137 |
| 12 | Infinity | 8.491 |  | 2.788 |
| 13 | Infinity | 2.093 | Fused silica | 31.000 |
| 14 | Infinity | 1.981 |  | 31.000 |
| 15 | 56.892 | 4.042 | Fused silica | 26.000 |
| 16 | 770.589 | −4.042 | MIRROR | 26.000 |
| 17 | 56.892 | −1.981 |  | 26.000 |
| 18 | Infinity | −2.093 | Fused silica | 31.000 |
| 19 | Infinity | −8.491 |  | 31.000 |
| 20 | 19.765 | 8.491 | MIRROR | 32.000 |
| 21 | Infinity | 2.093 | Fused silica | 31.000 |
| 22 | Infinity | 1.981 |  | 31.000 |
| 23 | 56.892 | 4.042 | Fused silica | 26.000 |
| 24 | 770.589 | 0.300 |  | 26.000 |
| IMA | Infinity |  |  | 0.815 |

In the lens prescription presented in Table 17, the surface corresponding to side 512 of element 511 is aspheric. The aspheric surface sag for this design is described using Equation (1). The aspheric surface sag parameters for the lens prescription in Table 17 are listed in Table 18.

TABLE 18

Aspheric surface sag parameters for the lens prescription in Table 17.

| | Surf 15, 17, 23 |
|---|---|
| Conic constant (k) | 0 |
| Maximum half diameter (r) mm | 13 |
| Curvature (c) 1/mm | 0.017577164 |
| $\alpha_1$ | 0 |
| $\alpha_2$ | −0.6780173 |
| $\alpha_3$ | 0.4888971 |
| $\alpha_4$ | 1.1306382 |
| $\alpha_5$ | −5.4378977 |
| $\alpha_6$ | 11.498947 |
| $\alpha_7$ | −13.692366 |
| $\alpha_8$ | 8.8128736 |
| $\alpha_9$ | −2.3621491 |

In the design presented in Tables 17 and 18, the numerical aperture may approach or even exceed approximately 0.97 in air. From FIG. 5, the focusing lens group 501 has the ability to receive light energy and transmit focused light energy. Field lens group 502 has the ability to receive intermediate light energy and transmit intermediate light energy. The catadioptric group or Mangin mirror arrangement 503 receives the intermediate energy and provides controlled light energy to the specimen 514. Alternately, the reflected path originates at the specimen, and light reflected from the specimen is received by the catadioptric group or Mangin mirror arrangement 503 and transmits reflected light energy from 514 and forms intermediate light energy. The field lens group 502 receives intermediate light energy and retransmits intermediate light energy. The focusing lens group receives resultant light energy and transmits focused resultant light energy. An aperture or mask can be placed at the aperture stop (not shown) to limit or modify the NA of the objective.

The lens prescription of Tables 17 and 18 operates at a 355 nm wavelength and has a field size of approximately 0.8 mm. Again, maximum element diameter is 32 mm which is significantly smaller than many objective designs previously employed with this field size and performance. The small size of this objective is particularly beneficial in view of the performance characteristics of the objective. This ultra-high NA objective supports a numerical aperture of approximately 0.97 in air and a polychromatic wavefront error of less than approximately 0.0327 waves.

The catadioptric lens prescription listed in Tables 17 and 18 using one aspheric surface allows the objective to simultaneously achieve desirable performance goals with loose tolerances. The highest sensitivity to a 10 micron element decenter in the focusing group 501 is 0.28 waves at 355 nm without compensation. The highest sensitivity to a 10 micron element decenter in the field lens group 502 is 0.2 waves at 355 nm without compensation. The highest sensitivity to a 10 micron element decenter for the catadioptric group 503 is 0.19 waves at 355 nm without compensation.

The lens prescription presented in Table 15 and Table 16 thus uses a single glass material, fused silica. Other materials may be employed in a similar fashion to the design presented in FIG. 1. Re-optimization for other wavelengths requires slight tuning or altering of components, and may generally be within the abilities of those skilled in the art. The lens prescription presented in Tables 17 and 18 is self corrected in a similar fashion to that presented in Tables 1 and 2. Also, the ultra-high NA objective design presented herein can support various modes of illumination and imaging as the objective in FIG. 1.

The present system design may be employed in various environments, including but not limited to lithography, microscopy, biological inspection, medical research, and the like.

The design presented herein and the specific aspects illustrated are meant not to be limiting, but may include alternate components while still incorporating the teachings and benefits of the invention, namely the small design having increased spectral bandwidth capabilities, potentially using a field lens formed of a different material, the design having a high NA. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. An objective employed for use in imaging a specimen, comprising:

a lens group comprising at least one focusing lens configured to receive light energy and form focused light energy, said focused light energy forming an intermediate image; and a catadioptric arrangement comprising a curved mirror element axially aligned with said lens group and positioned to receive the intermediate image and form controlled light energy;

wherein the catadioptric arrangement is positioned between the lens group and the specimen and consists of the curved mirror element and at most two additional elements positioned between the curved mirror element and the specimen, the at most two additional elements comprising an aspheric convex surface positioned between the curved mirror element and a relatively flat reflecting surface configured to reflect light energy back toward the curved mirror element;

and further wherein the lens group and catadioptric arrangement comprising the aspheric convex surface each have a maximum element diameter for all elements in the lens group and catadioptric arrangement comprising the aspheric convex surface of less than approximately 49 millimeters, and are collectively configured to provide a field size in excess of 0.8 mm and a numerical aperture of up to approximately 0.97 in air.

2. The objective of claim 1 wherein the aspheric surface conforms to the equation:

$$z = \frac{cr^2}{1 + \sqrt{1 - (1+k)c^2 r^2}} + \sum_{i=1}^{N} \alpha_i \rho^{2i},$$

where c is surface curvature, r a parameter ranging from zero to one half element diameter, k a conic constant, N a number of aspheric terms, ρ a normalized element radius, and α corresponds to aspheric coefficients.

3. The objective of claim 1 wherein the curved mirror element comprises an aspheric surface.

4. The objective of claim 1 wherein two aspheric surfaces are used in the catadioptric arrangement.

5. The objective of claim 4 wherein the aspheric surfaces are on separate elements.

6. The objective of claim 1 wherein three aspheric surfaces are used in the catadioptric arrangement.

7. The objective of claim 1, wherein the objective provides a polychromatic wavefront error of less than approximately 0.0407 waves.

8. The objective of claim 1, wherein the objective is self corrected.

9. The objective of claim 1 where the objective is composed of a single glass material.

10. An objective, comprising:
a lens group comprising at least one focusing lens, said lens group configured to receive light energy and form focused light energy, said focused light energy forming an intermediate image; and
a catadioptric arrangement comprising a curved mirror element axially aligned with said lens group and positioned to receive the intermediate image and form controlled light energy, said controlled light energy being provided toward a specimen to inspect the specimen;
wherein the catadioptric arrangement is positioned between the lens group and the specimen and consists of the curved mirror element and at most two additional elements positioned between the curved mirror element and the specimen, the at most two additional elements comprising an aspheric convex surface positioned between the curved mirror element and a relatively flat reflecting surface configured to reflect light energy back toward the curved mirror element;
and further wherein the lens group and catadioptric arrangement comprising the aspheric convex surface each have a maximum element diameter for all elements in the lens group and catadioptric arrangement comprising the aspheric convex surface of less than approximately 49 millimeters, and are collectively configured to provide a field size in excess of 0.8 mm and a numerical aperture of up to approximately 0.97 in air.

11. The objective of claim 10 wherein the aspheric surface conforms to the equation:

$$z = \frac{cr^2}{1 + \sqrt{1 - (1+k)c^2 r^2}} + \sum_{i=1}^{N} \alpha_i \rho^{2i},$$

where c is surface curvature, r a parameter ranging from zero to one half element diameter, k a conic constant, N a number of aspheric terms, $\rho$ a normalized element radius, and $\alpha$ corresponds to aspheric coefficients.

12. The objective of claim 10 wherein the curved mirror element comprises an aspheric surface.

13. The objective of claim 10 wherein two aspheric surfaces are used in the catadioptric arrangement.

14. The objective of claim 10 wherein three aspheric surfaces are used in the catadioptric arrangement.

15. An objective comprising:
focusing lens means receiving light energy and forming focused light energy, said focused light energy forming an intermediate image;
catadioptric means comprising a curved mirror element axially aligned with said focusing lens means and positioned to receive the intermediate image and form controlled light energy, said controlled light energy being provided toward a specimen;
wherein the catadioptric means is positioned between the lens group and the specimen and consists of the curved mirror element and at most two additional elements positioned between the curved mirror element and the specimen, the at most two additional elements comprising an aspheric convex surface positioned between the curved mirror element and a relatively flat reflecting surface and configured to reflect light energy back toward the curved mirror element;
and further wherein the focusing lens means and catadioptric means comprising the aspheric convex surface each have a maximum element diameter for all elements in the focusing lens means and catadioptric means comprising the aspheric convex surface of less than approximately 49 millimeters, and are collectively configured to provide a field size in excess of 0.8 mm and a numerical aperture of up to approximately 0.97 in air.

16. The objective of claim 15 wherein the aspheric surface conforms to the equation:

$$z = \frac{cr^2}{1 + \sqrt{1 - (1+k)c^2 r^2}} + \sum_{i=1}^{N} \alpha_i \rho^{2i},$$

where c is surface curvature, r a parameter ranging from zero to one half element diameter, k a conic constant, N a number of aspheric terms, $\rho$ a normalized element radius, and $\alpha$ corresponds to aspheric coefficients.

17. The objective of claim 15 wherein a plurality of aspheric surfaces is used in the catadioptric means.

18. The objective of claim 15, wherein the objective is self corrected.

19. The objective of claim 15 where the objective is composed of a single glass material.

* * * * *